(12) United States Patent
Shu et al.

(10) Patent No.: US 12,202,155 B2
(45) Date of Patent: Jan. 21, 2025

(54) BLADE CHANGE MECHANISM FOR POWER TOOL

(71) Applicant: Techtronic Cordless GP, Anderson, SC (US)

(72) Inventors: Gong Meng Shu, Anderson, SC (US); Da Zheng Li, Anderson, SC (US)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 18/229,946

(22) Filed: Aug. 3, 2023

(65) Prior Publication Data

US 2023/0411586 A1    Dec. 21, 2023

Related U.S. Application Data

(63) Continuation of application No. 17/459,378, filed on Aug. 27, 2021, now Pat. No. 11,482,697.

(30) Foreign Application Priority Data

Sep. 10, 2020   (CN) .......................... 202021965628.2
Feb. 5, 2021    (CN) .......................... 202120335406.0

(51) Int. Cl.
  *B26B 15/00*   (2006.01)
  *B26B 13/04*   (2006.01)
  (Continued)

(52) U.S. Cl.
  CPC ............. *B26B 15/00* (2013.01); *B26B 13/04* (2013.01); *B26B 13/28* (2013.01); *H01M 4/0404* (2013.01);
  (Continued)

(58) Field of Classification Search
  CPC ... B26B 13/00; B26B 13/04; B26B 13/12–20; B26B 13/28; B26B 15/00
  See application file for complete search history.

(56) References Cited

U.S. PATENT DOCUMENTS 605,608 A    6/1898  Larson
1,894,631 A * 1/1933  Owen ..................... F16B 39/24
                                                           411/979
(Continued)

FOREIGN PATENT DOCUMENTS

CN    102217494 A    10/2011
CN    205430100 U    8/2016
(Continued)

*Primary Examiner* — Adam J Eiseman
*Assistant Examiner* — Richard D Crosby, Jr.
(74) *Attorney, Agent, or Firm* — Dority & Manning, P.A.

(57) ABSTRACT

A blade replacement apparatus is disclosed, including a nut loosening/tightening member, a locking member, and an operating member, wherein one of the nut loosening/tightening member and the operating member is provided with a first matching portion, and the locking member is provided with a second matching portion. The operating member is movable between an operating position and a non-operating position. When the operating member is in the non-operating position, the first matching portion engages with the second matching portion. The locking member and the operating member are rotatable to one another. Rotation of the nut loosening/tightening member around a first axis is obstructed by the locking member. When the operating member is in the operating position, the first matching portion is disengaged from the second matching portion, and rotation of the nut loosening/tightening member around the first axis tightens or loosens the nut.

20 Claims, 8 Drawing Sheets

(51) Int. Cl.
*B26B 13/28* (2006.01)
*H01M 4/04* (2006.01)
*H01M 4/36* (2006.01)
*H01M 4/62* (2006.01)
*H01M 10/0525* (2010.01)

(52) U.S. Cl.
CPC .......... *H01M 4/0435* (2013.01); *H01M 4/366* (2013.01); *H01M 4/623* (2013.01); *H01M 10/0525* (2013.01)

(56) References Cited

U.S. PATENT DOCUMENTS

| | | |
|---|---|---|
| 2,721,591 A | 10/1955 | Criswell |
| 3,585,331 A | 6/1971 | Bednarski et al. |
| 4,942,637 A | 7/1990 | Yeang-Yai |
| 5,483,732 A | 1/1996 | Wang |
| 5,735,005 A | 4/1998 | Wang |
| 5,809,654 A | 9/1998 | Huang |
| 5,867,909 A | 2/1999 | Jeltsch et al. |
| 6,145,144 A | 11/2000 | Poehlmann et al. |
| 6,278,069 B1 | 8/2001 | Lee et al. |
| 6,721,984 B1 | 4/2004 | Harrison |
| 6,725,547 B2 | 4/2004 | Wu |
| 6,769,185 B2 | 8/2004 | Kottke et al. |
| 6,789,324 B2 | 9/2004 | Linden et al. |
| 6,812,425 B1 | 11/2004 | Wong |
| 6,813,835 B2 | 11/2004 | Deville |
| 6,958,455 B1 | 10/2005 | Lui |
| 6,964,099 B1 | 11/2005 | Zeng |
| 6,966,115 B2 | 11/2005 | Deville |
| 7,331,109 B2 | 2/2008 | Tu |
| 7,346,991 B1 | 3/2008 | Janson |
| 7,397,153 B2 | 7/2008 | Buck et al. |
| 7,530,172 B1 | 5/2009 | Wu |
| 7,607,231 B2 | 10/2009 | Klecker et al. |
| 7,640,666 B1 | 1/2010 | Huang |
| 8,046,925 B2 | 11/2011 | Wu |
| 8,047,083 B2 | 11/2011 | Puzio et al. |
| 8,069,573 B2 | 12/2011 | Wu |
| 8,104,384 B2 | 1/2012 | Wilkins et al. |
| 8,122,605 B2 | 2/2012 | Votolato |
| 8,122,607 B2 | 2/2012 | Maniwa et al. |
| 8,168,907 B2 | 5/2012 | Nemetz |
| 8,220,163 B2 | 7/2012 | Linden et al. |
| 8,225,513 B2 | 7/2012 | Huang |
| 8,250,765 B2 | 8/2012 | Wu |
| 8,316,548 B2 | 11/2012 | Dreher |
| 8,393,084 B2 | 3/2013 | Azpeitia Urrestarazu |
| D680,829 S | 4/2013 | Nelson et al. |
| 8,434,234 B2 | 5/2013 | Chen et al. |
| 8,590,165 B2 | 11/2013 | Huang |
| 8,607,677 B2 | 12/2013 | Nelson et al. |
| 8,661,691 B2 | 3/2014 | Huang |
| D702,524 S | 4/2014 | Nies et al. |
| 8,701,294 B2 | 4/2014 | Bruce et al. |
| 8,716,962 B2 | 5/2014 | Pusateri et al. |
| 8,723,060 B2 | 5/2014 | Parrinello et al. |
| 8,752,646 B2 | 6/2014 | Fujiwara et al. |
| 8,813,370 B2 | 8/2014 | Pellenc |
| 8,872,049 B2 | 10/2014 | Yuan |
| 8,893,390 B2 | 11/2014 | Nie et al. |
| 9,032,630 B2 | 5/2015 | Brown et al. |
| 9,144,201 B2 | 9/2015 | Vanttila et al. |
| 9,179,605 B2 * | 11/2015 | Yamaoka ............... A01G 3/037 |
| 9,180,585 B2 | 11/2015 | Jung et al. |
| 9,351,447 B2 | 5/2016 | Kubik et al. |
| 9,379,596 B2 | 6/2016 | Kraetzig |
| 9,408,350 B1 | 8/2016 | Wu |
| 9,427,859 B2 | 8/2016 | Maynez et al. |
| 9,457,462 B2 | 10/2016 | Mergener et al. |
| 9,511,500 B2 | 12/2016 | Lin |
| 9,521,810 B2 | 12/2016 | Zurcher |
| 9,565,806 B2 | 2/2017 | Maag et al. |
| 9,596,810 B2 | 3/2017 | Wu |
| 9,603,310 B2 | 3/2017 | Sampson |
| 9,622,422 B2 | 4/2017 | Hsu |
| D787,284 S | 5/2017 | Wu |
| 9,730,384 B2 | 8/2017 | Proudlock et al. |
| 9,744,658 B2 | 8/2017 | Simeone et al. |
| 9,757,868 B2 | 9/2017 | Winkel et al. |
| 9,815,188 B2 | 11/2017 | Kaupp et al. |
| 9,820,444 B2 | 11/2017 | Held |
| 9,853,586 B2 | 12/2017 | Kusakawa et al. |
| D806,489 S | 1/2018 | Fancelli et al. |
| 9,872,440 B2 | 1/2018 | Bieler et al. |
| 9,888,632 B2 | 2/2018 | Zhou et al. |
| 9,899,899 B2 | 2/2018 | Sergyeyenko et al. |
| 9,961,839 B2 | 5/2018 | Stones |
| 9,963,377 B2 | 5/2018 | Vangura |
| 9,978,541 B2 | 5/2018 | Mizutani et al. |
| 10,022,881 B2 | 7/2018 | Wolf et al. |
| 10,091,947 B2 | 10/2018 | Pellenc |
| 10,098,284 B2 | 10/2018 | Pellenc |
| 10,099,392 B2 | 10/2018 | Suda et al. |
| 10,172,292 B2 | 1/2019 | Zador et al. |
| 10,182,530 B1 | 1/2019 | Huang |
| 10,206,329 B2 | 2/2019 | Alexandersson et al. |
| 10,307,918 B2 | 6/2019 | Chen |
| 10,307,924 B2 | 6/2019 | Pellenc |
| 10,491,152 B2 | 11/2019 | Erickson et al. |
| 10,594,116 B2 | 3/2020 | Ballard et al. |
| 10,644,502 B2 | 5/2020 | Moessnang et al. |
| 10,681,873 B2 | 6/2020 | Pellenc et al. |
| 10,695,921 B2 | 6/2020 | Wong |
| 10,744,633 B2 | 8/2020 | Yoshinari et al. |
| D897,167 S | 9/2020 | Nelson et al. |
| 2004/0055164 A1* | 3/2004 | Molins .................. B26B 15/00 30/228 |
| 2006/0010693 A1 | 1/2006 | Jarman |
| 2009/0056147 A1* | 3/2009 | Zeng ...................... B26B 13/28 30/271 |
| 2010/0175902 A1 | 7/2010 | Rejman et al. |
| 2010/0326804 A1 | 12/2010 | Saur |
| 2011/0056082 A1 | 3/2011 | Nie |
| 2012/0246942 A1 | 10/2012 | Nie et al. |
| 2013/0019481 A1 | 1/2013 | Yamaoka et al. |
| 2013/0055575 A1 | 3/2013 | Delmas |
| 2014/0283392 A1 | 9/2014 | Mezher |
| 2015/0128427 A1 | 5/2015 | Linn |
| 2015/0336282 A1 | 11/2015 | Wang |
| 2017/0025934 A1 | 1/2017 | Stanfield et al. |
| 2017/0252932 A1 | 9/2017 | Savolainen |
| 2017/0293319 A1 | 10/2017 | Michel et al. |
| 2017/0359962 A1 | 12/2017 | Ma |
| 2018/0103593 A1 | 4/2018 | Zador et al. |
| 2018/0205244 A1 | 7/2018 | Ichikawa et al. |
| 2018/0215029 A1 | 8/2018 | Steckel |
| 2018/0222065 A1 | 8/2018 | Chen |
| 2018/0310486 A1 | 11/2018 | Thorn |
| 2019/0070720 A1 | 3/2019 | Rabe et al. |
| 2019/0134801 A1 | 5/2019 | Merget et al. |
| 2019/0257097 A1 | 8/2019 | Kawai et al. |
| 2020/0094392 A1 | 3/2020 | Larsen |
| 2020/0282481 A1 | 9/2020 | Lehr et al. |
| 2020/0388451 A1 | 12/2020 | Causey et al. |
| 2020/0396906 A1 | 12/2020 | Li et al. |
| 2021/0187764 A1 | 6/2021 | Cauley, Jr. et al. |
| 2021/0299894 A1 | 9/2021 | Lu |
| 2022/0063006 A1 | 3/2022 | Gilchrest |

FOREIGN PATENT DOCUMENTS

| | | |
|---|---|---|
| EP | 2156732 A1 | 2/2010 |
| EP | 2163853 A1 | 3/2010 |
| GB | 1213378 A | 11/1970 |
| JP | 2005/052384 A | 3/2005 |
| JP | 2008/067630 A | 3/2008 |
| JP | 2009/039034 A | 2/2009 |
| TW | 201031320 A | 9/2010 |
| WO | DM/057 083-002 | 5/2001 |
| WO | WO03057395 A1 | 7/2003 |
| WO | WO2004014609 A2 | 2/2004 |
| WO | DM/078 318-002 | 5/2012 |

(56) References Cited

FOREIGN PATENT DOCUMENTS

| | | |
|---|---|---|
| WO | DM/080 967-001 | 5/2013 |
| WO | WO2014/202911 A1 | 12/2014 |
| WO | WO2017/060849 A1 | 4/2017 |
| WO | WO2017/107050 A1 | 6/2017 |
| WO | DM/097 540-001 | 8/2017 |
| WO | WO2018/001216 A1 | 1/2018 |
| WO | WO2020/039628 A1 | 2/2020 |
| WO | WO2020/073880 A1 | 4/2020 |
| WO | WO2020/200503 A1 | 10/2020 |
| WO | DM/090 923-001 | 5/2021 |

* cited by examiner

BLADE CHANGE MECHANISM FOR POWER TOOL

This application is a continuation of U.S. patent application Ser. No. 17/469,378 filed on Sep. 8, 2021, which claims the benefit of priority to Chinese Patent Application No. 202120335406.0, filed on Feb. 5, 2021, and Chinese Patent Application no. 202021965628.2, filed on Sep. 10, 2020, the disclosures of which are incorporated by reference herein in their entireties.

TECHNICAL FIELD

The present utility model relates to a blade replacement mechanism, in particular to a blade replacement mechanism for electric instruments and an electric instrument equipped with the blade replacement mechanism, for example, a pair of electric scissors.

BACKGROUND ART

An electric instrument that employs a blade for cutting operations often needs blade replacements during use. Electric scissors, as a common electric garden instrument, may be used to prune branches. Such a type of electric scissors comprises a movable blade and an immovable blade, the movable blade being rotatably connected to the immovable blade and driven by a motor through a transmission mechanism to swing backwards and forwards, thereby performing a cutting action.

For electric scissors, a relatively sophisticated and economical design is employed in which the movable blade and the immovable blade are fixed with bolts and nuts. For the replacement of a blade of such electric scissors, a user generally needs to remove a screw with a screwdriver, open the casing, remove the nut from the bolt with a wrench, and then perform the assembly step after replacement with a new blade. Since electric scissors are used mainly outdoors, a user usually wants quick replacement of a blade on site when the blade has been worn, which affects the cutting efficiency; consequently, the user needs to carry instruments such as screwdrivers and wrenches. Moreover, in the process of disassembly and assembly, a removed part is likely to go missing due to its small size. If a user fails to complete the assembly correctly after replacing a blade, then a safety risk is posed.

Therefore, there is a need for a blade replacement mechanism that is easy to operate, that allows a blade replacement to be completed without using any instruments, and that can ensure user safety.

SUMMARY OF THE UTILITY MODEL

An objective of the present utility model is to design a fast, convenient, safe and reliable blade replacement apparatus in view of the above-mentioned defects in the prior art.

To achieve this objective, the present utility model provides a blade replacement apparatus: a blade replacement apparatus for replacing blades connected by a bolt, the bolt extending along a first axis, characterized in that the blade replacement apparatus comprises a nut that fits the bolt to fix the blade, a nut loosening/tightening member, a locking member, and an operating member, one of the nut loosening/tightening member and the operating member having a first matching portion, the locking member having a second matching portion, wherein the operating member is movable between an operating position and a non-operating position, the operating member allowing a user to perform an operation by hand without using any instruments; when the operating member is in the non-operating position, the first matching portion engages with the second matching portion, and the rotation of the nut loosening/tightening member around the first axis is obstructed by the locking member; when the operating member is in the operating position, the first matching portion is disengaged from the second matching portion, and the rotation of the nut loosening/tightening member around the first axis tightens or loosens the nut.

The nut and the nut loosening/tightening member may be integrally formed, or they may be components independent of each other. For example, the nut loosening/tightening member may define a cavity that is in a shape fit with the nut, and when the operating member is in the operating position, at least a part of the nut is located in the cavity.

In one embodiment, the operating member is pivotally connected to the nut loosening/tightening member, so that the operating member may rotate around a second axis that is not parallel to the first axis, and preferably, the second axis is perpendicular to the first axis.

In one embodiment, the operating member and the nut loosening/tightening member are formed integrally or connected such that the two are not rotatable relative to each other, and the operating member is movable along the first axis as operated by a user to move into or out of the operating position.

The blade replacement apparatus may comprise a biasing member, and when the operating member is not operated, a biasing force generated by the biasing member keeps the operating member in the non-operating position. In one embodiment, the operating member comprises a grip portion and a biasing action portion that are respectively located on either side of the second axis, and a biasing force is applied to the biasing action portion. At least a part of the biasing member may be accommodated in the nut loosening/tightening member. Favorably, a biasing member holding body is disposed between the biasing member and the biasing action portion; one end of the biasing member holding body is connected to the biasing member, and the other end is in contact with the biasing action portion. Preferably, the other end of the biasing member holding body forms a hemispherical contact portion that is in contact with the biasing action portion in the form of a recess on the operating member.

In one embodiment, the locking member is located between the nut loosening/tightening member and the operating member, and the first matching portion is formed on the operating member. Preferably, the first matching portion comprises at least one protrusion formed on the surface of the operating member, and the second matching portion comprises at least one groove or hole formed on the locking member; when the operating member is in the non-operating position, the at least one protrusion is located in the at least one groove or hole. The locking member may be formed as an annular member that surrounds at least a part of the nut loosening/tightening member, and the second matching portion comprises at least one groove formed on the inner edge or the outer edge of the annular member.

In another aspect, the present utility model provides a type of electric scissors, comprising a casing; two blades protruding from the front end of the casing; a bolt connecting the two blades, the bolt extending along a first axis and passing through the two blades so that at least one blade is rotatable around the first axis; and the blade replacement apparatus described above.

In one embodiment, the two blades include an immovable blade and a movable blade, and the pair of electric scissors further comprises a holder that has a blade supporting portion between the immovable blade and the locking member, the blade supporting portion defining a through hole which a bolt may extend to pass through, the locking member being connected with the blade supporting portion. Preferably, the blade supporting portion comprises a bottom and a boss that extends from the bottom, and the immovable blade is arranged on the bottom around the boss.

In one embodiment, the bolt comprises a movable blade engagement section, a holder engagement section, and a nut engagement section, the movable blade engagement section allowing the movable blade to rotate around it, the holder engagement section preventing the blade supporting portion from rotating around it. Preferably, the holder engagement section has a non-circular cross section, and at least a part of the through hole of the blade supporting portion has a cross section matching the shape of the non-circular cross section.

In an embodiment, the pair of electric scissors further comprises a blade driving member and a transmission assembly, the blade driving member being connected with the movable blade, the transmission assembly being located in the casing, wherein the blade driving member is formed with a hole through which the bolt may pass, and the blade driving member is connected with the output end of the transmission assembly, so that the blade driving member is driven by the transmission assembly to rotate around the bolt and transmit the rotational movement to the movable blade.

In one embodiment, the blade driving member and the movable blade are adjacently arranged along the first axis, the end of the movable blade forms a third matching portion, and the blade driving member is formed with a fourth matching portion engaged with the third matching portion. Preferably, the third matching portion comprises one of a protrusion, a groove, and a tooth portion located on the edge of the movable blade. The fourth matching portion extends from the surface of the blade driving member along the first axis. Preferably, when the bolt is removed, the movable blade may be taken out in a direction perpendicular to the first axis without being obstructed by the blade driving member.

DETAILED DESCRIPTION OF THE UTILITY MODEL

Figure 1:
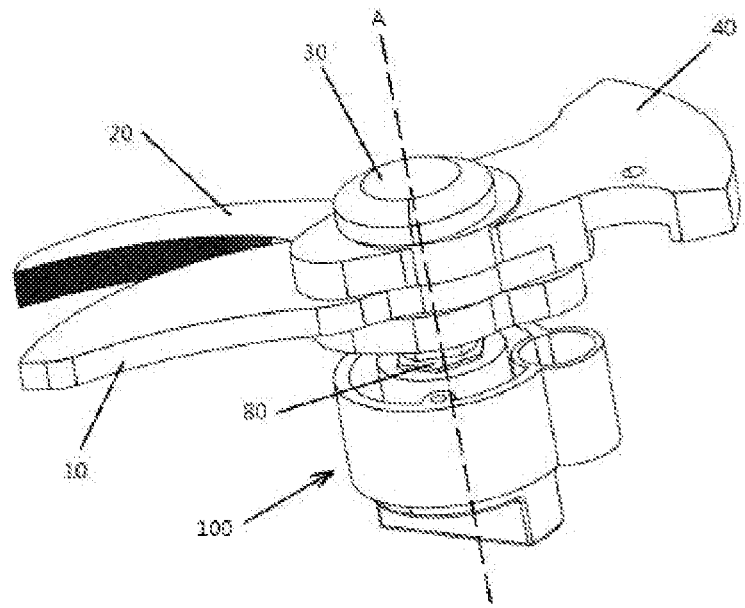
FIG. 1 shows a blade assembly equipped with a blade replacement apparatus according to a first embodiment of the present utility model.

FIG. 1 shows a blade assembly for cutting, which has a blade replacement apparatus 100 according to a first embodiment of the present utility model. The blade assembly comprises two blades 10 and 20 that are connected by a bolt 30. A hole is formed in the two blades 10 and 20, respectively; the bolt 30 passes through the holes in the blades 10 and 20 along a first axis A, and the blades 10 and 20 are fixed by tightening a nut 80.

In this embodiment, the lower blade 20 (that is, the blade close to the nut 80) is an immovable blade, which remains immovable during operation. The upper blade 10 is a movable blade, which rotates around the bolt 30 during operation to cooperate with the immovable blade 20, thereby performing cutting operations. In another embodiment, both blades are rotatable around the bolt, or the lower blade 20 is a movable blade. The blade replacement apparatus 100 according to the present utility model is suitable for various blade assemblies fixed by bolts and nuts, and the number of blades may be changed as required, instead of being limited to the embodiment shown in FIG. 1.

Figure 2:
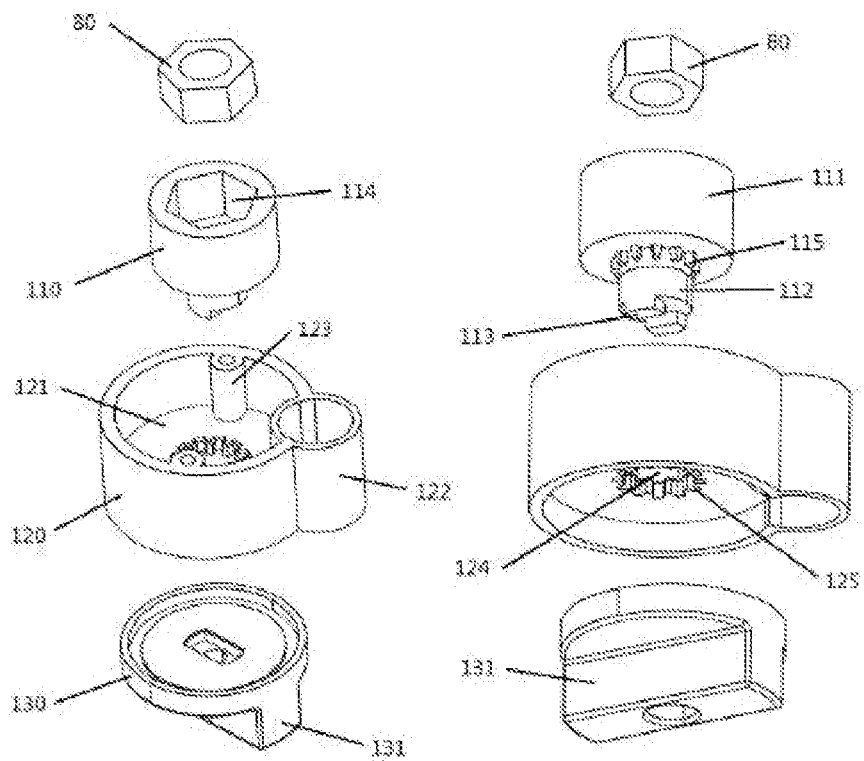
FIG. 2 shows a disassembled state of the blade replacement apparatus according to the first embodiment of the present utility model.

FIG. 2 shows the blade replacement apparatus 100, which comprises a nut 80, a nut loosening/tightening member 110, a locking member 120, and an operating member 130. In this embodiment, the nut loosening/tightening member 110 is a component independent of the nut 80, and the nut loosening/tightening member 110 has a cavity 114 that is in a shape fit with the nut 80. It is understandable that the nut 80 is not limited to the hexagonal nut shown in the figure, and other types of nuts and matching cavities are also suitable for the present utility model. In another embodiment not shown, the nut 80 and the nut loosening/tightening member 110 may be integrally formed. For example, a thread is formed on the inner surface of the cavity 114 of the nut loosening/tightening member 110. Thus, the nut loosening/tightening member 110 itself may, as a nut, be screwed to the bolt 30, without the need for a separate nut.

The operating member 130 comprises a knob 131, which allows a user to directly perform an operation by hand, without the need for using any instruments. The operating member 130 is connected to the nut loosening/tightening member 110 so that the movement of the operating member 130 is transmissible to the nut loosening/tightening member 110. The operating member 130 may be integrally formed with the nut loosening/tightening member 110, or the operating member 130 and the nut loosening/tightening member 110 are connected such that the two are not rotatable relative to each other. In the embodiment shown in FIG. 2, the nut loosening/tightening member 110 comprises a protrusion 113 engaged with the operating member 130.

Since the nut 80, the nut loosening/tightening member 110 and the operating member 130 are not rotatable relative to each other, when a user rotates the operating member 130, the nut loosening/tightening member 110 and the nut 80 also rotate. Therefore, a user can remove the nut 80 from the bolt 30 by rotating the operating member 130 in order to remove the blades 10 and 20 and the user, after replacing the blades with new ones, can tighten the nut 80 by rotating the operating member 130 in the opposite direction. In another embodiment, the nut 80, the nut loosening/tightening member 110, and the operating member 130 may be integrally formed.

However, if the operating member 130 is rotated accidentally, the nut 80 may loosen. In order to prevent the nut 80 from loosening, the blade replacement apparatus 100 according to the present utility model provides a locking member 120 for locking the nut 80 so that it is not rotatable relative to the bolt 30. In this embodiment, the locking is achieved by the engagement between a first matching portion 115 formed on the nut loosening/tightening member 110 and a second matching portion 125 formed on the locking member 120. In another embodiment, the locking is achieved by the engagement between the first matching portion formed on the operating member 130 and the second matching portion formed on the locking member 120. Without the need to replace any blades, the first matching portion 115 and the second matching portion 125 are engaged with each other to achieve locking; since the rotation of the nut loosening/tightening member 110 or the operating member 130 is obstructed by the locking member 120, the nut 80 is not rotatable. When replacing a blade, a user needs to disengage the first matching portion 115 from the second matching portion 125, so that the rotation of the nut loosening/tightening member 110 or the operating member 130 drives the nut 80 to rotate.

In the embodiment shown in FIG. 2, the nut loosening/tightening member 110 comprises an upper portion 111 that defines the cavity 114, a lower portion 113 connected to the operating member 130, and an intermediate portion 112 between the two. The first matching portion 115 comprises a protrusion formed on the intermediate portion 112, for example, at least one rib or tooth protruding from the surface of the intermediate portion 112. In another embodiment, a protrusion may be formed on the surface of the upper portion 111. The locking member 120 is configured as an annular body that at least partially surrounds the nut loosening/tightening member 110 to prevent the nut loosening/tightening member 110 from becoming exposed. The locking member 120 comprises a plate 121 that defines an opening 124, and the intermediate portion 112 of the nut loosening/tightening member 110 can extend to pass through the opening 124. The second matching portion 125 comprises at least one groove that is formed on the edge of the opening 124 and whose size matches that of at least one rib or tooth on the intermediate portion 112.

Besides allowing a user to tighten or loosen the nut 80, the operating member 130 provides an unlocking function. The operating member 130 is movable between an operating position and a non-operating position. In this embodiment, when the operating member 130 is in the non-operating position, the first matching portion 115 on the nut loosening/tightening member 110 engages with the second matching portion 125 on the locking member 120, and the rotation of the nut loosening/tightening member 110 is obstructed by the locking member 120. When the operating member 130 is in the operating position, the first matching portion 115 on the nut loosening/tightening member 110 is disengaged from the second matching portion 125 on the locking member 120, and the rotation of the nut loosening/tightening member 110 is transmissible to the nut 80. A user can move the operating member 130 along the first axis A by pressing or pulling out the operating member 130, so that the operating member 130 enters or leaves the operating position.

Preferably, the blade replacement apparatus 100 further comprises a biasing member (not shown in the figure), which applies a biasing force to the operating member 130 or the nut loosening/tightening member 110. When a user has not moved the operating member 130, the biasing force keeps the operating member 130 in the non-operating position. The biasing member may be a force-restoring element, for example, a spring, and a user needs to, by overcoming the biasing force, move the operating member 130 to the operating position. Alternatively, the first matching portion 115 and the second matching portion 125 may be provided with magnetic elements that attract each other, and a user needs to, by overcoming the magnetic force, move the operating member 130 to the operating position.

Figure 3:
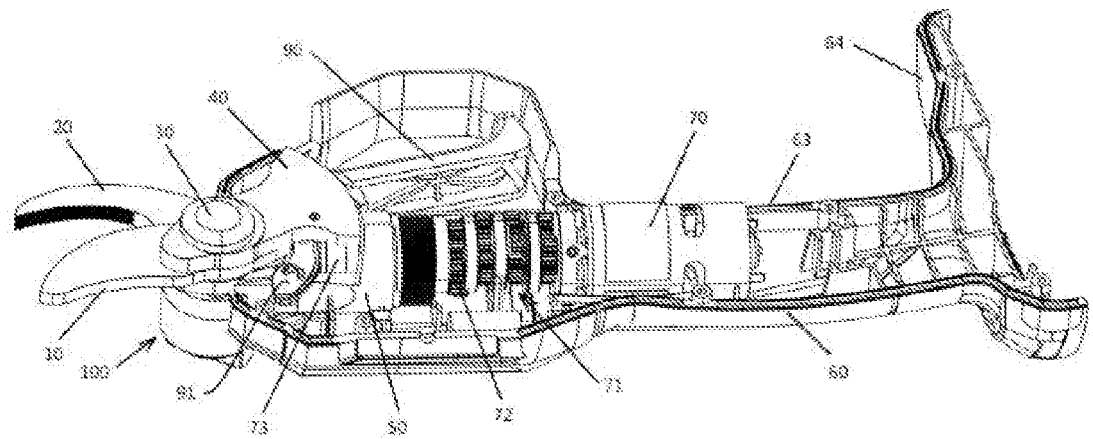
FIG. 3 shows a pair of electric scissors equipped with a blade replacement apparatus according to a first embodiment of the present utility model.

FIG. 3 shows a pair of electric scissors according to the present utility model, which comprises a blade replacement apparatus 100, making it convenient for a user to replace a blade that has reached the end of its service life or is damaged. The pair of electric scissors comprises a casing 60 in which a motor 70 and a transmission assembly 71 are accommodated. In this embodiment, the transmission assembly 71 comprises a deceleration mechanism 72 and a transmission mechanism 73. The deceleration mechanism 72 is connected to the output shaft of the motor 70 and is used to reduce the rotation speed and increase the torque. The transmission mechanism 73 is connected to the output end of the deceleration mechanism 72 and is used to transmit a driving force to the blade assembly. The deceleration mechanism 72 may be at least a primary planetary gear set, or a gear set formed by meshing a plurality of gears of different sizes. The transmission mechanism 73 may be a spur gear or a bevel gear. It is understandable that the transmission assembly may comprise any mechanism capable of transforming a rotary motion of the motor output shaft into a rotary motion of a blade, for example, a lead screw nut mechanism.

On the casing 60, a handle 63 for being held by a user is formed, and a battery mounting portion 64 is formed at the bottom of the handle. A battery connected to the battery mounting portion 64 powers the motor 70 to drive a blade. The pair of electric scissors further comprises a trigger 90, and a user activates the motor 70 by pressing the trigger 90. In the embodiment shown in FIG. 3, a sensor plate 91 is provided between the transmission assembly 71 and the blade assembly, and a sensor for detecting a blade position and a trigger position is arranged on the plate. The control unit (not shown in the figure) of the motor is disposed inside the handle 63, for example, on a side of the motor 70 or near the battery mounting portion 64. The control unit controls the rotation of the motor 70 on the basis of a signal sent by the sensor.

Figure 4:
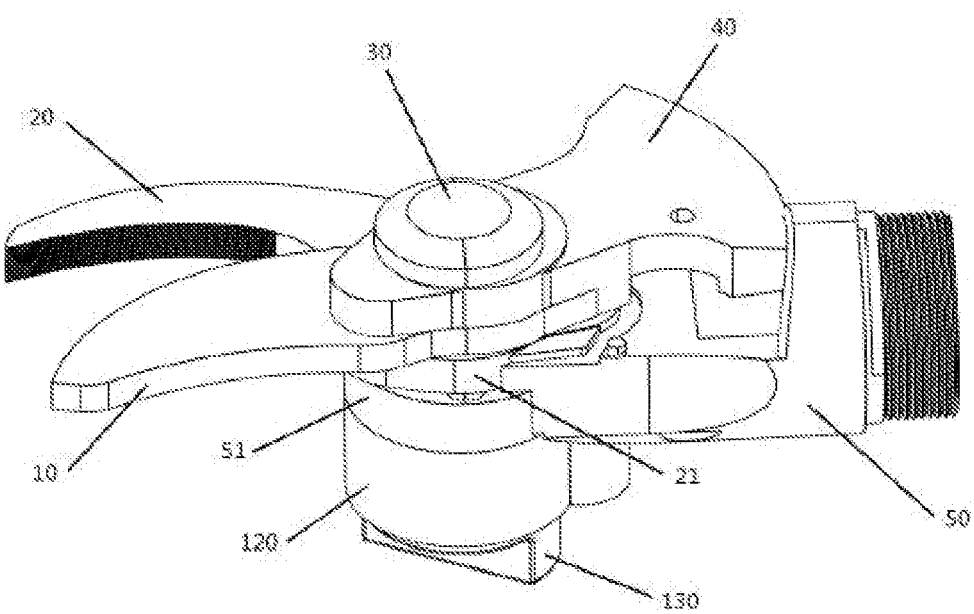
FIG. 4 shows the blade assembly of the electric scissors in FIG. 3.

FIG. 4 shows the blade assembly of the electric scissors. The blade assembly shown in FIG. 4, compared with that shown in FIG. 1, further comprises a holder 50 for supporting the blade. The holder 50 is provided with a blade supporting portion 51 located between the immovable blade 20 and the locking member 120. The blade supporting portion 51 is connected to the locking portion 120, and one end 21 of the immovable blade 20 is fixed to the blade supporting portion 51.

Figure 5:
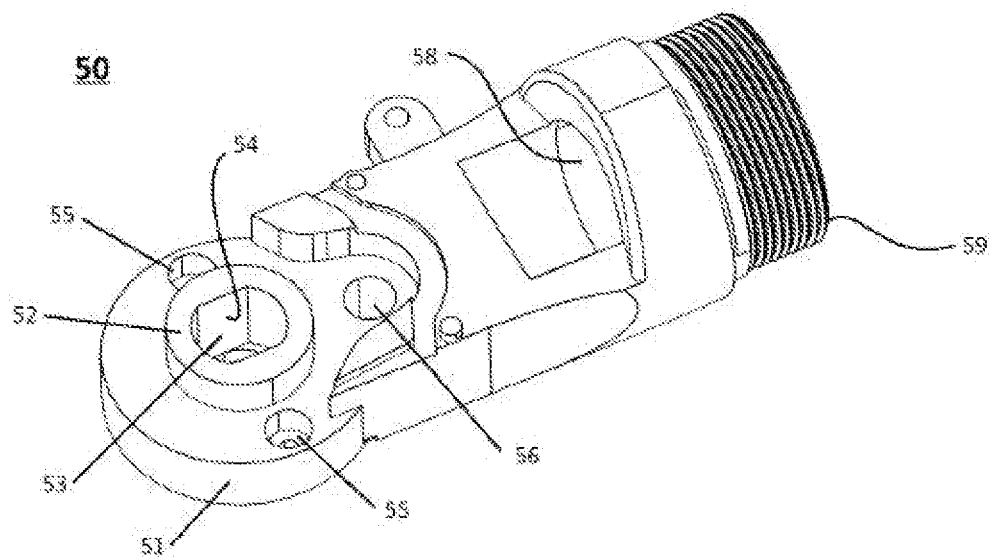
FIG. 5 shows the holder of the blade assembly in FIG. 4.

The specific structure of the holder 50 is shown in FIG. 5. The front end of the holder 50 is formed on the blade supporting portion 51, the blade supporting portion 51 comprises a bottom and a boss 52 that extends from the bottom, and the immovable blade 20 is arranged on the bottom around the boss 52. The blade supporting portion 51 has a through hole 53 that penetrates the boss 52 and the bottom. In this embodiment, in the bottom of the blade supporting portion 51, a first fastener hole 55 is formed, which is aligned with a fastener receiving portion 123 (shown in FIG. 2) formed on the locking portion 120, and a first fastener penetrates the first fastener hole 55 and enters the fastener receiving portion 123 to establish a fixed connection between the blade supporting portion 51 and the locking portion 120. In the bottom of the blade supporting portion 51, a second fastener hole 56 is also formed, which is aligned with a through hole 22 (shown in FIG. 8) at one end of the immovable blade 20, and a second fastener penetrates the second fastener hole 56 and the through hole at one end of the immovable blade 20 to establish a fixed connection between the blade supporting portion 51 and the immovable blade 20. At the rear end of the holder 50, a threaded joint 59 is provided, which is fixedly connected with a casing of the transmission assembly 71 (for example, a gear box casing). The holder 50 further comprises a positioning portion 58 for positioning the transmission mechanism 73.

Figure 6:
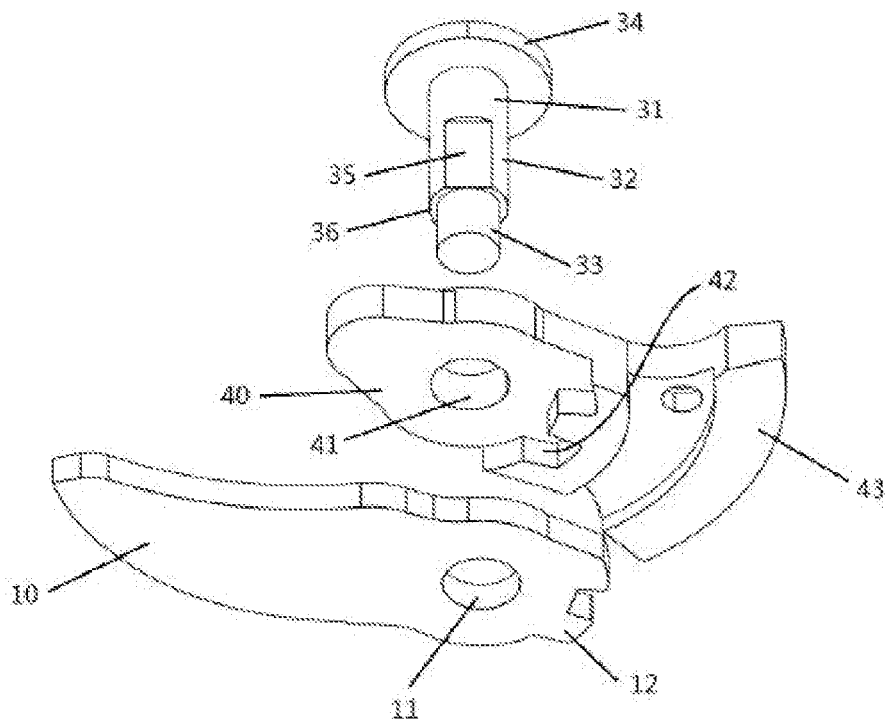
FIG. 6 shows the bolt, the blade driving member, and the movable blade of the blade assembly in FIG. 4.

FIG. 6 shows the bolt 30, which comprises a movable blade engagement section 31, a holder engagement section 32, and a nut engagement section 33. The movable blade engagement section 31 allows the movable blade 10 to rotate around it, the holder engagement section 32 prevents the blade supporting portion 51 from rotating around it, and the nut engagement section 33 is connected with the nut 80 in a threaded manner. In this embodiment, the holder engagement section 32 has a non-circular cross section, and at least a part of the through hole 53 of the blade supporting portion 51 has a cross section that is in a shape fit with the non-circular cross section. As shown in FIG. 5, a part of the inner wall of the blade supporting portion 51 defining the through hole 53 is a flat surface 54, which fits a flat surface 35 of the holder engagement section 32. Since the blade supporting portion 51 is not rotatable relative to the bolt 30, and the blade supporting portion 51 is fixedly connected to the locking portion 120, when the operating member 130 is in the non-operating position, the locking portion 120 can prevent the nut loosening/tightening member 110 from rotating around the bolt 30, instead of rotating around the bolt 30 together with the nut loosening/tightening member 110. In addition, in the embodiment shown in FIG. 6, a step 36 is formed at the junction of the holder engagement section 32 and the nut engagement section 33, and the step 36 can define a limit position of the nut 80.

The blade assembly shown in FIG. 4 further comprises a blade driving member 40, which is connected to the movable blade 10 such that the two are not rotatable relative to each other, and is used to transmit a movement of the output end of the transmission assembly 71 to the movable blade 10. FIG. 6 shows the blade driving member 40 comprising a fan-shaped swing tooth, a tooth portion 43 of which is a bevel tooth formed on the lower surface of the edge area; the bevel tooth engages with the transmission mechanism 73 (shown in FIG. 3) of the transmission assembly 71, the transmission mechanism 73 comprising a bevel gear. The blade driving member 40 is arranged adjacent to the movable blade 10 along the first axis, a third matching portion 12 is formed at the end of the movable blade 10, and a fourth matching portion 42 that matches the third matching portion 12 is formed in a corresponding position on the blade driving member 40. In this embodiment, the third matching portion 12 comprises a protrusion, a groove, or a tooth portion formed at the edge of the movable blade 10. The blade driving member 40 is disposed above the movable blade 10, and the fourth matching portion 42 comprises a groove, a protrusion or a tooth portion extending from the lower surface of the blade driving member 40 along the first axis. The blade driving member 40 also defines a hole 41. The movable blade engagement portion 31 of the bolt passes through the hole 41 of the driver 40 and the hole 11 of the movable blade 10. When the electric scissors operate, the blade driving member 40 drives the movable blade 10 to rotate around the bolt 30.

Figure 7:
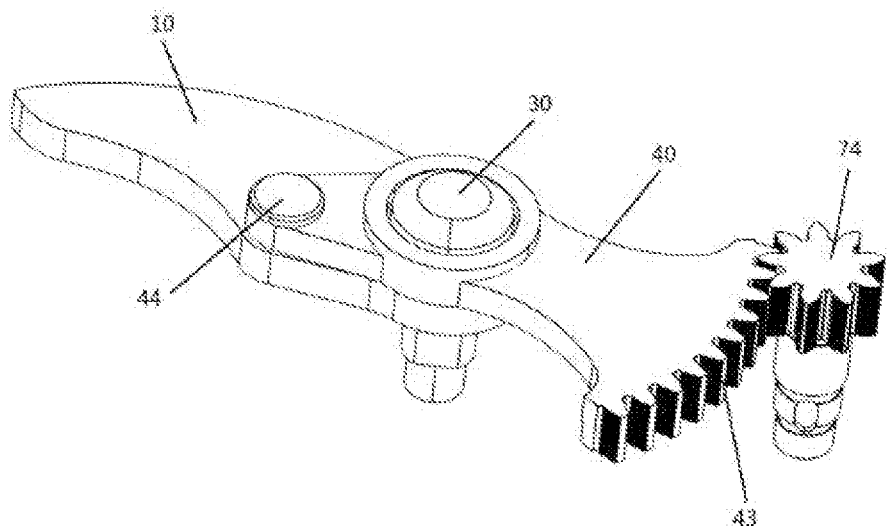
FIG. 7 shows a modification of the blade assembly.

FIG. 7 shows a modification of the blade assembly, in which the tooth portion 43 of the blade driving member 40 is a straight tooth formed on the edge thereof, and the straight tooth meshes with the spur gear 74 of the transmission mechanism 73. A connection between the blade driving member 40 and the movable blade 10 is established by a fastener 44.

Figure 8:
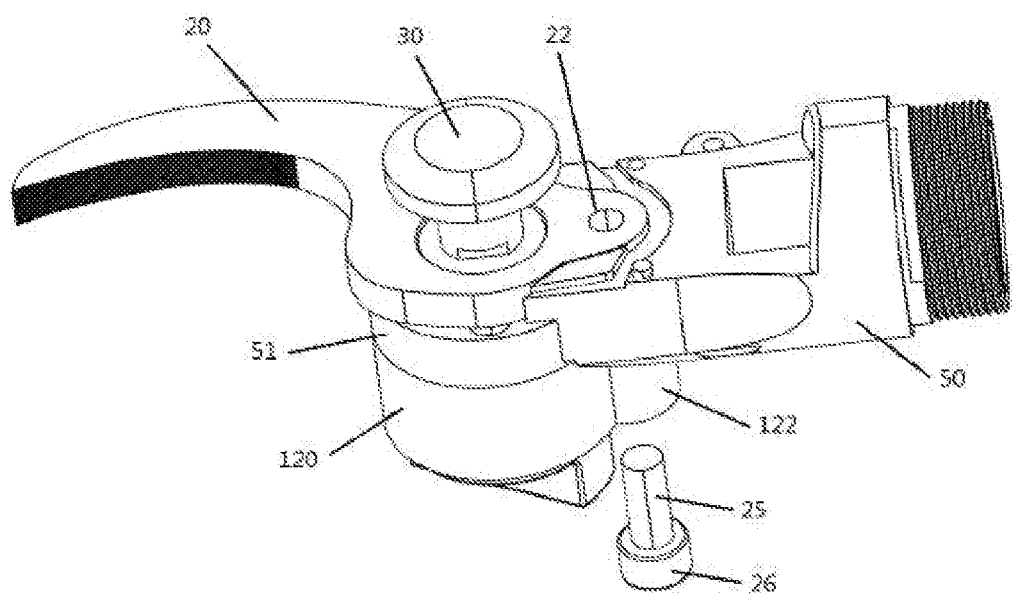
FIG. 8 shows the blade assembly from which the blade driving member and the movable blade are removed.

FIG. 8 shows the blade assembly from which the blade driving member 40 and the movable blade 10 are removed. The immovable blade 20 and the blade supporting portion 51 are connected by a second fastener 25. The second fastener 25 may be a screw or a pin, which passes through the second fastener hole 56 (shown in FIG. 5) of the blade supporting portion 51 and the through hole 22 of the immovable blade 20. Optionally, the locking member 120 comprises an annular portion 122, the annular portion 122 surrounding the head 26 of the fastener 25 to prevent the head 26 from becoming exposed.

Figure 9:
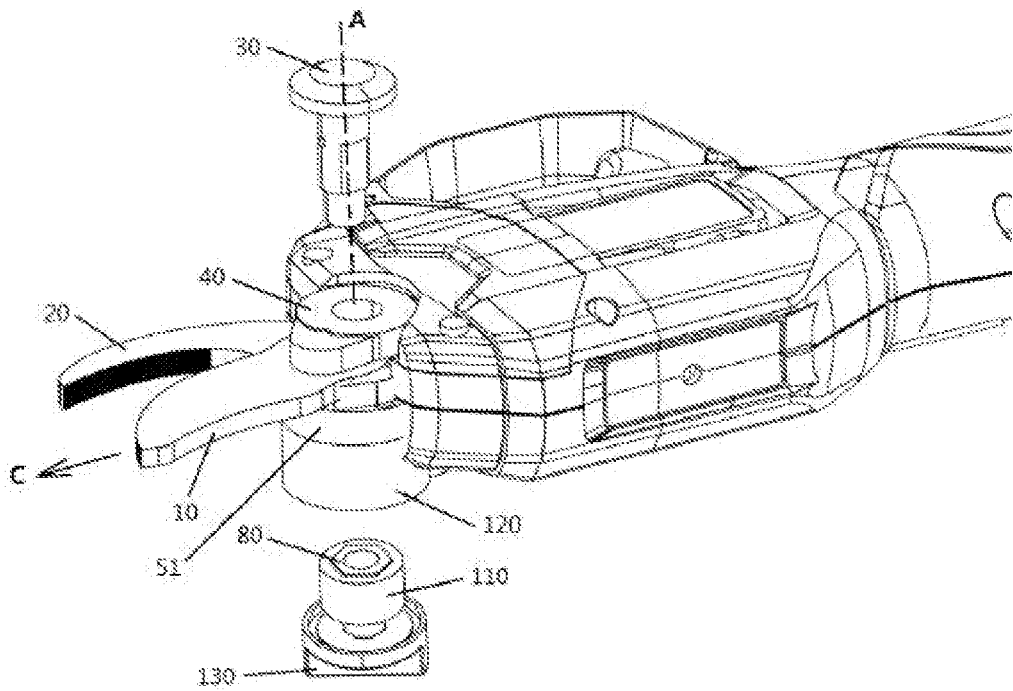
FIG. 9 shows the state of the electric scissors when the movable blade is replaced.

FIG. 9 shows the state of the electric scissors when a blade is replaced, and the pair of electric scissors is provided with the blade driving member 40 and the movable blade 10 shown in FIG. 6. After a user, using the operating member 130, removes the nut 80 from the bolt 30 and takes out the bolt 30, the movement of the movable blade 10 in the direction C perpendicular to the first axis A is not obstructed by adjacent components (the blade driving member 40 in the upper part and the immovable blade 20 and the blade supporting portion 51 that are in the lower part), so that the user can pull out the movable blade 10 in the direction C. It should be noted that the nut 80, the nut loosening/tightening member 110, and the operating member 130 are removed from the electric scissors not necessarily as shown in the figure. After the nut 80 is separated from the bolt 30, the nut 80, the nut loosening/tightening member 110, and the operating member 130 may be kept on the electric scissors, for example, being supported by the locking member 120.

To replace the immovable blade 20, a user can, after pulling out the movable blade 10, pull out the blade driving member 40 in the same direction C. If the second fastener 25 used to fix the immovable blade 20 and the blade supporting portion 51 is a screw, the user needs to remove the screw first, and then remove the immovable blade from the boss 52 of the blade supporting portion 51 and take it out. Although an instrument is required to remove a screw, there is no need to open the casing 60 during the entire blade replacement.

Figure 10:
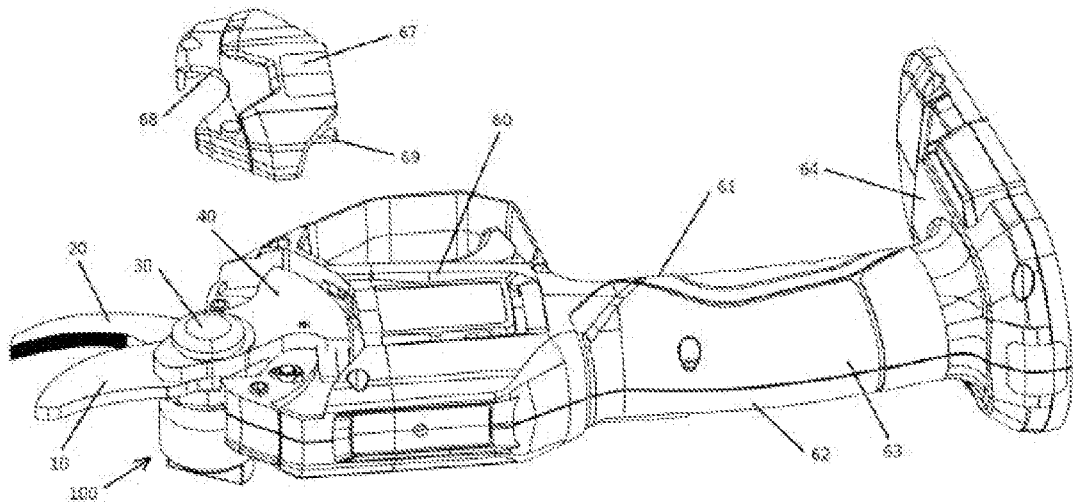
FIG. 10 shows a pair of electric scissors comprising a casing.

The casing 60 of the electric scissors is shown in FIG. 10, which comprises an upper casing half 61, a lower casing half 62, and a cover plate 67. The cover plate 67 covers at least a part of the blade driving member 40. In this embodiment, the front side of the cover plate 67 has a notch 68 that partially surrounds the head of the bolt 30, and the rear side of the cover plate 67 has a connecting portion 69 that fits the upper casing half 61.

Figure 11:
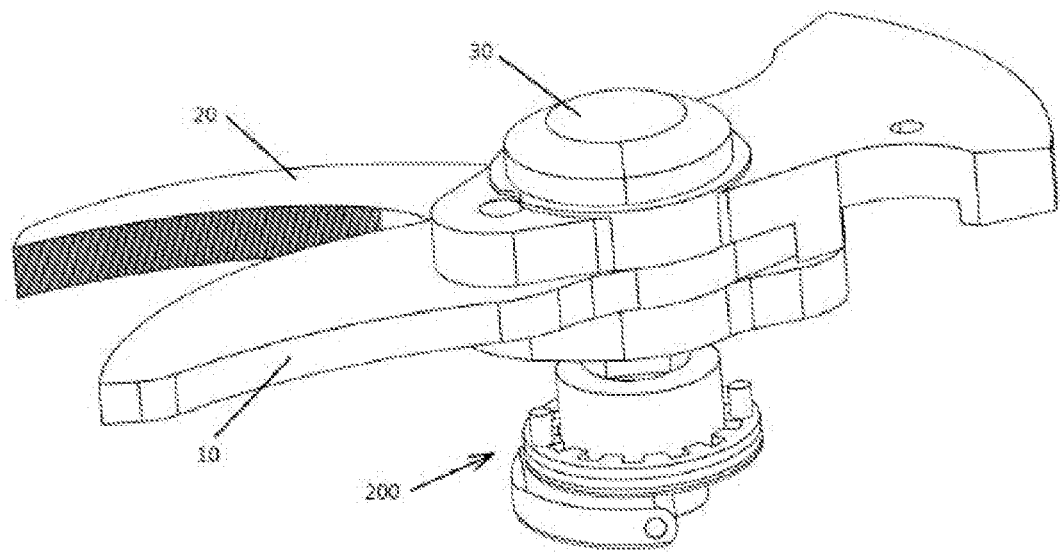
FIG. 11 shows a blade assembly equipped with a blade replacement apparatus according to a second embodiment of the present utility model.

FIG. 11 shows a blade assembly equipped with a blade replacement apparatus 200 according to the second embodiment of the present utility model. The blades 10, 20 and the bolt 30 in the blade assembly are the same as those in the first embodiment, and so will not be described in detail again herein.

Figure 12:
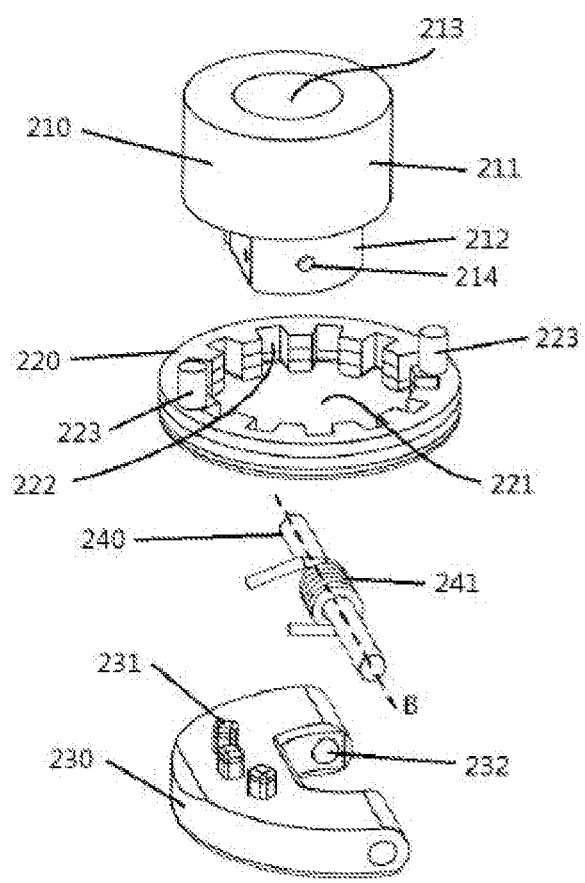
FIG. 12 shows a disassembled state of the blade replacement apparatus according to a second embodiment of the present utility model.

The specific structure of the blade replacement apparatus 200 is shown in FIG. 12. The blade replacement apparatus 200 comprises a nut loosening/tightening member 210, a locking member 220, and an operating member 230. In this embodiment, the nut for tightening a blade is integrally formed in the nut loosening/tightening member 210. The nut loosening/tightening member 210 may comprise an upper portion 211 that performs the function of a nut and a lower portion 212 connected to the operating member 230. The upper portion 211 defines a cavity or hole 213, and a thread is formed on its inner surface.

The nut loosening/tightening member 210 and the operating member 230 are connected by a shaft 240 so that the operating member 230 is rotatable around the shaft 240 relative to the nut loosening/tightening member 210. Holes 214 and 232 for receiving the shaft 240 are formed on the nut loosening/tightening member 210 and the operating member 230, respectively. In this embodiment, the shaft 240 extends along the second axis B, and the second axis B is not parallel to the first axis A. Preferably, the second axis B is roughly perpendicular to the first axis A.

Similar to the first embodiment shown in FIG. 1, the locking member 220 in the second embodiment is also arranged between the nut loosening/tightening member 210 and the operating member 230. The locking member 220 is configured as an annular body, which defines an opening 221, and at least a part of the nut loosening/tightening member 210 extends through the opening 221. The second matching portion 220 on the locking member 222 comprises at least one groove formed on the inner edge or the outer edge of the locking member 220. A first matching portion 231 that engages with the second matching portion 222 to achieve locking is formed on the operating member 230. In this embodiment, the first matching portion 231 comprises at least one protrusion that extends from the surface of the operating member 230 and whose size matches that of at least one groove on the locking member 220. It is understandable that the first and second matching portions in other forms are also suitable for the present utility model.

Without the need to replace a blade, the first matching portion 231 and the second matching portion 222 engage with each other to achieve locking, and the rotational movement of the operating member 230 around the first axis A is obstructed by the locking member 220 and therefore is not transmissible to the nut loosening/tightening member 210. When a blade needs to be replaced, a user first rotates the operating member 230 around the second axis B to disengage the first matching portion 231 on the operating member 230 from the second matching portion 222 on the locking member 220. Then, the user rotates the operating member 230 around the first axis A, and the rotational movement is transmitted to the nut loosening/tightening member 210 via the shaft 240, so that the nut loosening/tightening member 210 is removed from the bolt 30.

The blade replacement apparatus 200 in this embodiment may also comprise a biasing member 241 that applies a biasing force to the operating member 230. When the operating member 230 is not operated, the biasing force keeps the operating member 230 in the non-operating position. The biasing member may be a coil spring on the shaft 240, and a user needs to, by overcoming the biasing force applied by the coil spring, move the operating member 230 to the operating position. In another embodiment, a locking mechanism (for example, a snap member) may be used to keep the operating member 230 in the non-operating position, and a user can move the operating member 230 to the operating position only by releasing the locking mechanism.

Figure 13:
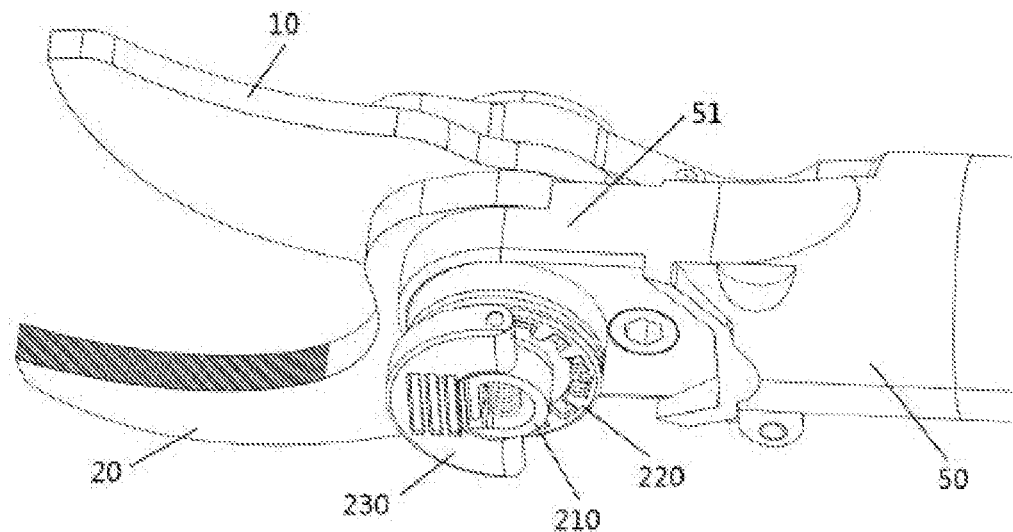
FIG. 13 shows a pair of electric scissors equipped with a blade replacement apparatus according to a second embodiment of the present utility model.

FIG. 13 shows the blade assembly of the electric scissors, which is equipped with the blade replacement apparatus according to the second embodiment of the present utility model. Similar to the embodiment shown in FIG. 4, the blade assembly comprises a holder 50 for supporting a blade. The holder 50 is provided with a blade supporting portion 51 located between the immovable blade 20 and the locking member 220. The blade supporting portion 51 is connected to the locking member 220, and one end of the immovable blade 20 is fixed to the blade supporting portion 51. The locking portion 220 shown in FIG. 12 is provided with a protrusion 223 extending upwards. A hole for accommodating the protrusion 223 is formed in a corresponding position on the lower surface of the blade supporting portion 51.

Figure 14:
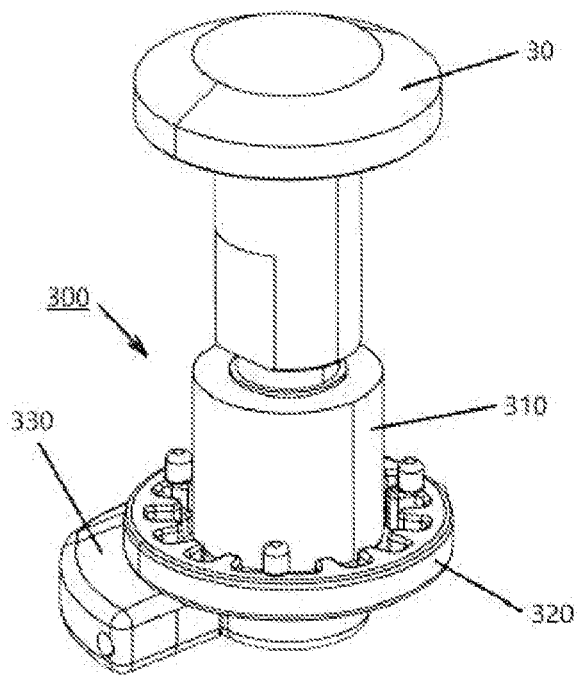
FIG. 14 shows a blade replacement apparatus according to a third embodiment of the present utility model.

FIG. 14 shows a blade replacement apparatus 300 according to a third embodiment of the present utility model, which comprises a nut loosening/tightening member 310, a locking member 320, and an operating member 330. A nut that fits the bolt 30 to tighten a blade (not shown in the figure) is integrally formed in the nut loosening/tightening member 310, and a user loosens or tightens the nut by rotating the operating member 330.

Figure 15:
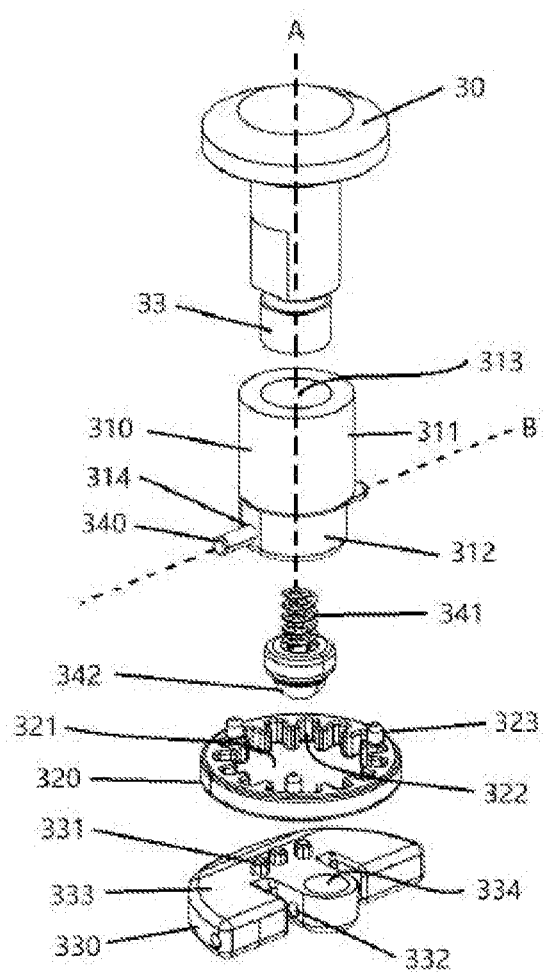
FIG. 15 shows a disassembled state of the blade replacement apparatus according to the third embodiment of the present utility model.

An exploded view of the blade replacement apparatus 300 is shown in FIG. 15. The nut loosening/tightening member 310 comprises an upper portion 311 that performs the function of a nut and a lower portion 312 connected to the operating member 330. The upper portion 311 defines a cavity or hole 313, with a thread formed on its inner surface, for engaging with a thread 33 on the bolt 30. The nut loosening/tightening member 310 and the operating member 330 are connected by a shaft 340 so that the operating member 330 is rotatable around the shaft 340 relative to the nut loosening/tightening member 310. Holes 314 and 332 for receiving the shaft 340 are formed on the nut loosening/tightening member 310 and the operating member 330, respectively. In this embodiment, the bolt 30 extends along the first axis A, the shaft 340 extends along the second axis B, and the second axis B is roughly perpendicular to the first axis A.

Similar to the first and second embodiments, the locking member 320 in this embodiment is also arranged between the nut loosening/tightening member 310 and the operating member 330. The locking member 320 is configured as an annular body, which defines an opening 321, and at least a part of the nut loosening/tightening member 310 extends through the opening 321. The second matching portion 320 on the locking member 322 comprises at least one groove formed on the inner edge or the outer edge of the locking member 320. A first matching portion 331 that engages with the second matching portion 322 to achieve locking is formed on the operating member 330, and the first matching portion 331 comprises at least one protrusion extending from the surface of the operating member 330.

Without the need to replace a blade, the first matching portion 331 and the second matching portion 322 engage with each other to achieve locking, and the rotational movement of the operating member 330 around the first axis A is obstructed by the locking member 320 and therefore is not transmissible to the nut loosening/tightening member 310. When a blade needs to be replaced, a user first rotates the operating member 330 around the second axis B to disengage the first matching portion 331 on the operating member 330 from the second matching portion 322 on the locking member 320. Then, the user rotates the operating member 330 around the first axis A, and the rotational movement is transmitted to the nut loosening/tightening member 310 via the shaft 340, so that the nut loosening/tightening member 310 is removed from the bolt 30.

The blade replacement apparatus 300 further comprises a biasing member 341 that applies a biasing force to the operating member 330 to keep the operating member 330 in the non-operating position. The main differences between the third embodiment and the second embodiment lie in the arrangement of the biasing member 341 and the structure of the operating member 330. In the third embodiment, the biasing member 341 in the form of a coil spring is disposed above the operating member 330, and preferably, at least a part of the biasing member 341 is accommodated in the nut loosening/tightening member 310. The operating member 330 comprises a grip portion 333 and a biasing action portion 334, and a biasing force applied by the biasing member 341 acts on the biasing action portion 334.

Figure 16:
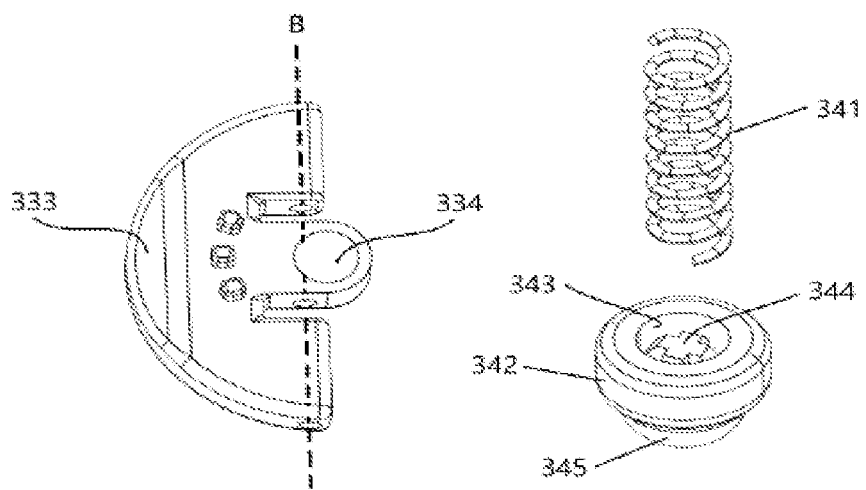
FIG. 16 shows the components in the blade replacement apparatus according to the third embodiment of the present utility model.

The operating member 330 in the blade replacement apparatus 300 according to the third embodiment is shown in FIG. 16. The grip portion 333 and the biasing portion 334 are located on both sides of the second axis B, respectively. By applying a biasing force to the biasing action portion 334, the biasing member 341 generates a torque that causes the operating member 330 to rotate in a clockwise direction around the second axis B, thereby keeping the operating member 330 in the non-operating position.

Preferably, a biasing member holding body 342 is provided between the biasing member 341 and the biasing action portion 334, of which one end is connected to the biasing member 341 and the other end is in contact with the biasing action portion 334.

One embodiment of the biasing member holding body 342 is shown in FIG. 16. One end of the biasing member holding body 342 defines an opening 343 for accommodating at least a part of the biasing member 341. In this embodiment, a protrusion 344 for keeping the biasing member 341 in a predetermined extension direction (the vertical direction shown in the figure) is formed in the opening 343. At the other end of the biasing member holding body 342, a contact portion 345 is formed, which is preferably hemispherical, and is in contact with and applies a biasing force to the biasing portion 334 in the form of a recess on the operating member 330. It is advantageous to adopt a hemispherical contact portion 345 and a recessed biasing action portion 334 because the shape fit between the two helps to maintain the positioning of the contact portion 345. In addition, when a user rotates the operating member 330 around the second axis B using the grip portion 333, the contact surface between the hemispherical contact portion 345 and the biasing action portion 334 can reduce the wear on the contact portion 345 and the biasing action portion 334 caused during the rotation.

While the present utility model has been described in detail above with only certain embodiments, it should be understood that the present utility model is not limited to these disclosed embodiments. Those skilled in the art can envisage other embodiments that conform to the spirit and scope of the present utility model, including changes in quantities of components, alterations, substitutions or equivalent arrangements, and all such embodiments shall fall within the scope of the present utility model.

The invention claimed is:

1. A blade replacement apparatus for replacing blades connected by a bolt, the bolt extending along a first axis, comprising:
   a nut that fits the bolt to fix the blade;
   a nut loosening/tightening member; and
   an operating member, one of the nut loosening/tightening member and the operating member is provided with a first matching portion, and the locking member is provided with a second matching portion;
   wherein the operating member is movable between an operating position and a non-operating position, the operating member allowing a user to perform an operation by hand without using any instruments;
   wherein when the operating member is in the non-operating position, the first matching portion engages with the second matching portion, the locking member and the operating member rotatable to one another, and the rotation of the nut loosening/tightening member around the first axis is obstructed by the locking member; and
   wherein when the operating member is in the operating position, the first matching portion is disengaged from the second matching portion, and the rotation of the nut loosening/tightening member around the first axis tightens or loosens the nut.

2. The blade replacement apparatus of claim 1, wherein when the operating member is in the operating position, the first matching portion is completely disengaged from the second matching portion.

3. The blade replacement apparatus of claim 1, the nut loosening/tightening member comprising a first portion defining a cavity and a second portion connected to the operating member, and wherein an intermediate portion is positioned between the first portion and the second portion.

4. The blade replacement apparatus of claim 3, wherein the first matching portion comprises a protrusion formed on the first portion or the intermediate portion.

5. The blade replacement apparatus of claim 3, wherein the cavity is in a shape fit with the nut, and when the operating member is in the operating position, at least a part of the nut is located in the cavity.

6. The blade replacement apparatus of claim 3, wherein the locking member is configured as an annular body at least partially surrounding the nut loosening/tightening member to prevent exposure of the nut loosening/tightening member therethrough.

7. The blade replacement apparatus of claim 3, wherein the nut and the nut loosening/tightening member are components independent of each other.

8. The blade replacement apparatus of claim 1, wherein the nut and the nut loosening/tightening member are integrally formed.

9. The blade replacement apparatus of claim 1, wherein the operating member is rotatable around a second axis not parallel to the first axis.

10. The blade replacement apparatus of claim 1, comprising:
   a holder for supporting a blade, the holder comprising a blade supporting portion positioned between the blade and the locking member.

11. The blade replacement apparatus of claim 10, wherein a front end of the holder is formed on the blade supporting portion, the blade supporting portion comprising a bottom and a boss extending from the bottom, and wherein the blade is arranged on the bottom around the boss.

12. The blade replacement apparatus of claim 10, wherein the locking member comprises a fastener receiving portion, and wherein the blade supporting portion forms a fastener hole aligned with the fastener receiving portion at the locking member.

13. The blade replacement apparatus of claim 12, comprising a fastener insertable into the fastener hole and the fastener receiving portion to provide a fixed connection between the blade supporting portion and the locking member.

14. The blade replacement apparatus of claim 10, the blade supporting portion forming a fastener hole aligned with a hole at the blade, and wherein a fastener is insertable through the hole at the blade and the fastener hole to provide a fixed connection between the blade supporting portion and the blade.

15. The blade replacement apparatus of claim 1, comprising a biasing member, wherein when the operating member is not operated, a biasing force generated by the biasing member keeps the operating member in the non-operating position.

16. The blade replacement apparatus of claim 1, wherein the locking member is located between the nut loosening/tightening member and the operating member, and the first matching portion is formed on the operating member and wherein the first fitting portion comprises at least one protrusion formed on the surface of the operating member, and the second matching portion comprises at least one groove or hole formed on the locking member; when the operating member is in the non-operating position, the at least one protrusion is located in the at least one groove or hole.

17. A pair of electric scissors, comprising:
a casing;
two blades protruding from the front end of the casing;
a bolt connecting the two blades, the bolt extending along the first axis and passing through the two blades so that at least one blade is rotatable around the first axis; and
the blade replacement apparatus as claimed in claim 1.

18. The pair of electric scissors of claim 17, comprising:
a motor positioned within the casing;
a transmission assembly positioned within the casing and operably coupled to the motor;
a holder for supporting at least one of the two blades, the holder comprising a blade supporting portion positioned between the blade and the locking member, the holder comprising a positioning portion for positioning a transmission mechanism of the transmission assembly.

19. The pair of electric scissors of claim 18, comprising:
a blade driving member connected to at least one of the two blades, the blade driving member comprising a tooth portion engaging the transmission mechanism, the blade driving member arranged adjacent along the first axis to at least one of the two blades.

20. The pair of electric scissors of claim 19, wherein at least one of the two blades comprises a third matching portion, and wherein the blade driving member comprises a fourth matching portion corresponding in position to the third matching portion, wherein the third matching portion comprises a protrusion, a groove, or a tooth.

* * * * *